United States Patent [19]

Johnson et al.

[11] Patent Number: 4,526,453

[45] Date of Patent: Jul. 2, 1985

[54] METHOD OF AND APPARATUS FOR DISTINGUISHING BETWEEN EXPOSED AND UNEXPOSED FILM UNITS

[75] Inventors: Bruce K. Johnson, Andover; Anthony J. Schettino, Arlington, both of Mass.

[73] Assignee: Polaroid Corporation, Cambridge, Mass.

[21] Appl. No.: 490,316

[22] Filed: May 2, 1983

[51] Int. Cl.³ ............................................. G03B 19/10
[52] U.S. Cl. .................................................... 354/181
[58] Field of Search ................................. 354/181, 86

[56] References Cited

U.S. PATENT DOCUMENTS

| | | | |
|---|---|---|---|
| 239,925 | 4/1881 | Blair | 354/181 |
| 376,798 | 1/1888 | Davison | 354/181 |
| 2,854,903 | 10/1958 | Land et al. | 95/12.21 |
| 3,255,670 | 6/1966 | Lasermann | 91/33 |
| 3,350,990 | 11/1967 | Finelli et al. | 95/13 |
| 3,369,469 | 2/1968 | Downey | 95/13 |
| 3,369,470 | 2/1968 | Downey | 95/13 |
| 3,421,423 | 1/1969 | Downey et al. | 95/13 |
| 3,437,023 | 4/1969 | Downey et al. | 95/13 |
| 3,437,024 | 4/1969 | Downey et al. | 95/13 |
| 3,446,127 | 5/1969 | Silverman et al. | 95/12 |
| 3,446,131 | 5/1969 | Cook et al. | 95/13 |
| 3,455,222 | 7/1969 | Downey | 95/13 |
| 3,525,293 | 8/1970 | Harvey | 95/13 |
| 3,541,937 | 11/1970 | Nerwin | 95/13 |
| 3,541,938 | 11/1970 | Harvey | 95/13 |
| 3,541,939 | 11/1970 | Kamp | 95/30 |
| 3,541,940 | 11/1970 | Bartnick et al. | 95/30 |
| 3,575,081 | 4/1971 | Nerwin | 88/1.5 |
| 3,614,920 | 10/1971 | Kamp | 95/13 |
| 3,648,527 | 3/1972 | Kamp | 74/17.5 |
| 4,034,393 | 7/1977 | Goldmacher | 354/354 |
| 4,114,166 | 9/1978 | Driscoll et al. | 354/76 |
| 4,265,525 | 5/1981 | Stella et al. | 354/76 |
| 4,311,377 | 1/1982 | Matteson | 354/217 |
| 4,324,469 | 4/1982 | Harvey | 354/214 |

*Primary Examiner*—William B. Perkey
*Attorney, Agent, or Firm*—Leslie J. Payne

[57] ABSTRACT

A photographic system is disclosed having a cassette containing unexposed film units therein. A film handling apparatus cooperates with the units for selectively withdrawing the units from the cassette for exposure and then returning them for storage. Also, there is means for use in facilitating the differentiation between exposed and unexposed film units. Such differentiation is facilitated by altering the position of the exposed units relative to the unexposed units.

19 Claims, 3 Drawing Figures

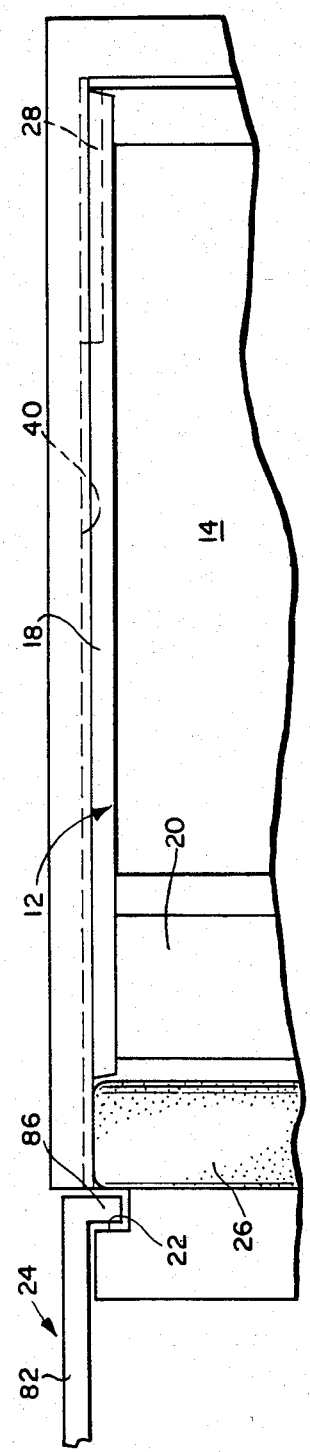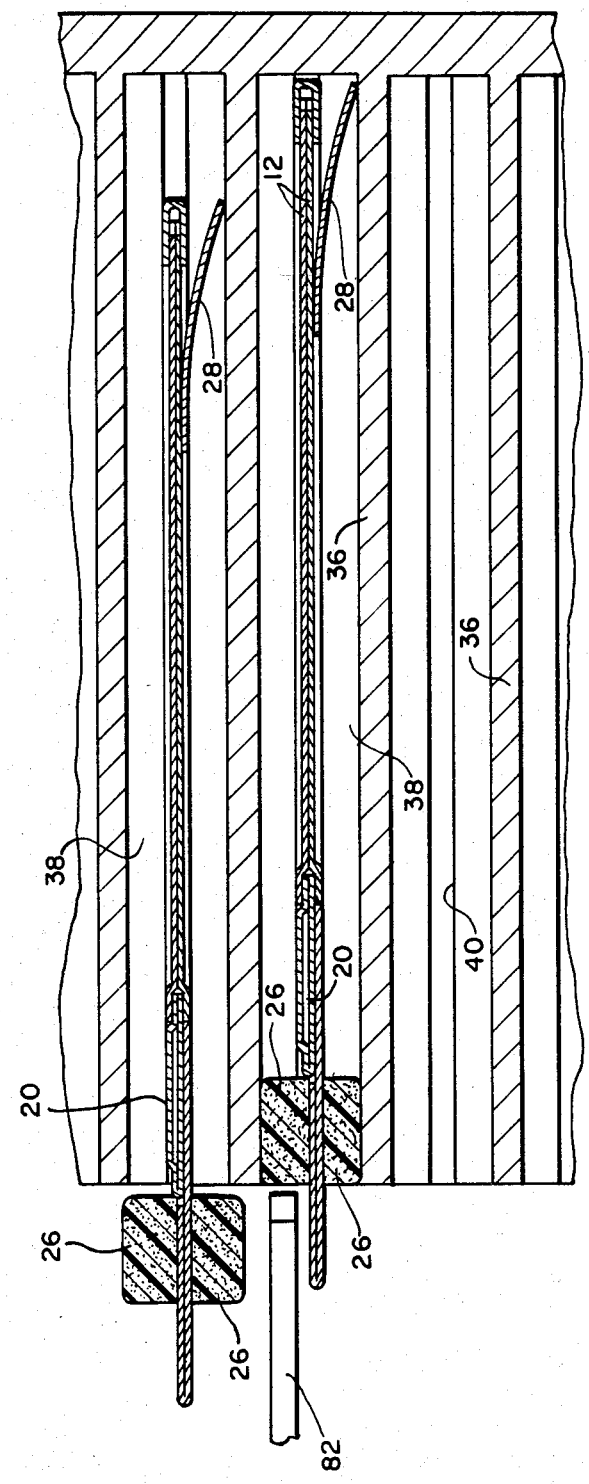

METHOD OF AND APPARATUS FOR DISTINGUISHING BETWEEN EXPOSED AND UNEXPOSED FILM UNITS

BACKGROUND OF THE INVENTION

This invention relates generally to a film cassette containing a plurality of film units usable in a photographic apparatus and, more particularly, to a cassette which can be removed from the apparatus without admitting light to the sensitive areas of unexposed film units as well as facilitating the distinguishing of exposed and unexposed film units.

Often photographers desire to remove a film cassette from a camera before all the film frames have been exposed. This may occur when the photographer wishes to replace a cartridge having color film, with a cartridge containing black-and-white film or vice versa.

Several techniques have been developed for purposes of insuring proper reuse of cartridges so that the original exposures are not double exposed or unexposed film frames are wasted. One known approach is described in U.S. Pat. No. 4,034,393. This patent describes a continuous strip of film storable in a cylindrical type cartridge and includes tabs and labels for purposes of distinguishing between exposed and unexposed film frames. In this regard, the tab prevents the leader end of the film strip from being rewound entirely into the cassette while the label allows recording of the number of exposed frames. Exemplary of other approaches in this area are those described in the following U.S. Pat. Nos.: 4,311,377 and 4,324,469.

Other cameras of the self-developing type are configured for exposing and processing positive image transparency units (i.e., instant slides). Examples of such cameras are shown in the following commonly-assigned U.S. Pat. Nos: 2,854,903; 3,255,670; 3,350,990; 3,369,469; 3,369,470; 3,421,423; 3,437,023; 3,437,024; 3,446,127; 3,446,131; 3,455,222; 3,541,939; 3,541,940; 3,541,937; 3,541,938; 3,575,081; 3,525,293; 3,614,920; 3,648,527; and 3,636,844.

To varying degrees these cameras require that the photographer manually handle the transparency after processing. Of course, this increases the possibility of it becoming damaged. Moreover, the user must interrupt his picture taking to remove the processed slide and find a dirt and dust-free environment for its storage. The camera described in U.S. Pat. No. 3,350,990 has an imbibition chamber large enough to receive all the exposed film units. But if the user wishes to view his results before taking the next picture, he must remove the slide for viewing and then manually reinsert the slide for storage.

The camera described in U.S. Pat. No. 2,854,903 uses a transparency film unit having a strippable opaque backing sheet for preventing exposure to the underlying sheets in the unexposed stack of film units.

In U.S. Pat. No. 3,541,940 there is disclosed a film magazine having a supply chamber containing unexposed film units and a storage chamber for storing exposed film units. However, such an approach requires the user to manually remove the slide from the camera imbibition chamber and insert it into the magazine storage chamber.

Commonly-assigned U.S. Pat. No. 4,114,166 requires two removable chambers, one for unexposed film units and the other for exposed film units; however, the user need not touch the transparency. Commonly-assigned U.S. Pat. No. 4,265,525 discloses use of a disc carrying small format positive transparencies being rotatable in a camera and having separate exposing and viewing stations, whereby not all of the film units need be exposed.

None of the known foregoing cameras especially of the self-developing type use individual self-developing film units and make provision for a single removable cassette which can house both exposed and unexposed film units, let alone distinguishing between unexposed and exposed film units in such a container.

SUMMARY OF THE INVENTION

For overcoming the shortcomings of the prior art as noted above, there is provided, in accordance with the principles of the present invention, an improved film cassette and system which facilitate storing and distinguishing between exposed and unexposed film units.

There is provided a film cassette for use with a camera which cassette comprises an open faced casing and a plurality of film units. Each unit has a light sensitive area and is stacked in the casing with a given edge portion of each presented at the open face for facilitating sequential removal of each within a camera for exposure. Included is a light attenuating member located between adjacent film units and extending across the light sensitive area thereof so as to attenuate transmission of light to the light sensitive area of any of the undeveloped film units responsive to removal of a film unit whereby the cassette may be exposed to light following removal of one or more film units, but prior to exposure and development of all units, without admitting light to the light sensitive areas of the remaining film units.

Included in the improved system is means for defining a housing having at least one compartment sized and configured to storing therein at least one image recording film unit. The film unit is capable of being removable from an original stored position in the compartment for allowing exposure thereof as well as being returnable to a new stored position. The latter being different from the former. In connection with the above, there is provided means for altering the position of the unit from the original stored position upon reinsertion. As a result, the differentiation between exposed and unexposed film units can be determined.

In one embodiment, there is provided means for restricting reinsertion of the unit and which includes means for altering the dimensions of the unit in response to at least partial removal of such unit from the compartment. In particular, expandable and contractable foam material is placed on the unit so as to restrict reinsertion of the unit into the compartment to the original stored position once the foam material has been withdrawn from the compartment. The foam also serves as a light shield.

Among the other objects and features of the present invention are the provision of a system wherein unexposed and exposed film units are retained in the same container and can be removed from a camera; the provision for an improved system wherein exposed and unexposed image recording units may be easily differentiated; the provision of an improved system for differentiating between a plurality of exposed and unexposed positive image transparencies storable in the same container; the provision of a system wherein there is means for altering the position of the film unit, for purposes of differentiating between exposed and unexposed film units; the provision of means for inhibiting return of the unit to its original position following exposure; the provision wherein said inhibiting means includes dimension altering means attached to the film unit; and wherein the dimension altering means includes expandable and contractable material which is also opaque. The invention also includes a method for achieving such differentiating.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 2 is an enlarged fragmented view of a film unit and a pick arm; and,

FIG. 3 is an enlarged fragmented schematic view of the arrangement of exposed and unexposed film units in the container.

DETAILED DESCRIPTION

Figure 1:
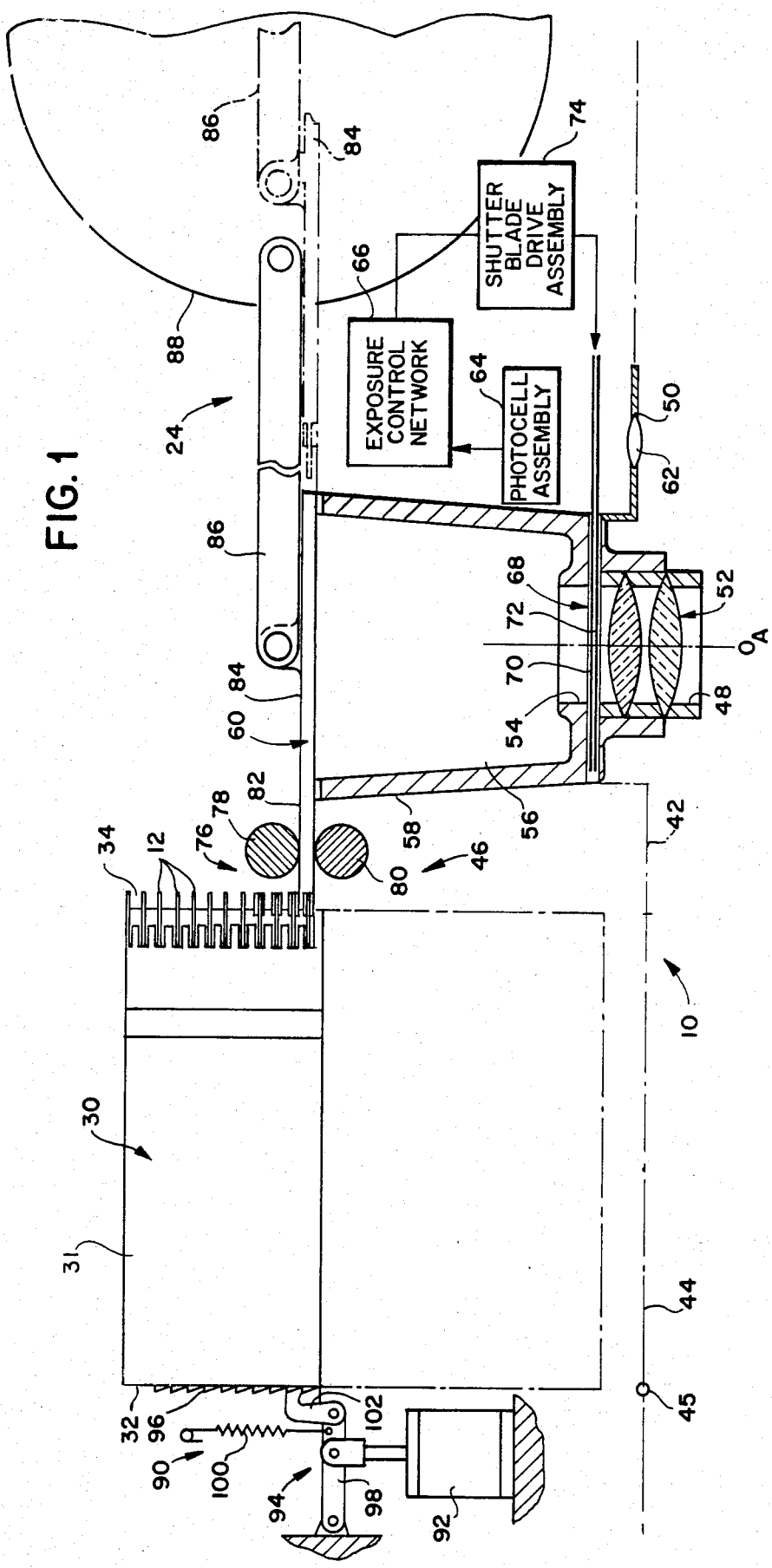
FIG. 1 is a schematic planar view showing the construction of the present invention.

Reference is now made to FIGS. 1–3 for showing an embodiment of the present invention. There is illustrated in diagrammatic form a photographic camera apparatus indicated generally by reference numeral 10 only a part of which is shown in phantom lines. This camera 10 is of the type which is preferably usable for exposing a plurality of thin self-developing image recordable film units 12 which when processed provide preferably viewable positive transparencies.

Each of the film units 12 is of the small format type and includes a rectangular image receiving area 14 which is actinic to ambient scene radiation incident thereon. Also included in the film unit 12 is a border 18 of relatively stiff paper or other suitable material. Formed in the border 18 adjacent the leading edge of the film unit 12 is a rupturable pod 20 containing processing fluid. A fluid trap (not shown) is formed adjacent the trailing edge of the film unit 12. A pair of notches or indentations 22 only one of which is shown is also formed adjacent the leading edge of each film unit 12. These notches 22 are shaped and sized to cooperate with a film handling mechanism 24 in a manner to be described presently. Formed intermediate the pod 20 and the notches 22 is a pair of strips 26 of foam material; one strip for each side of the film unit 12. The foam material is of the type which is expandable and contractable, but also opaque for purposes to be made apparent. One type of foam material 12 usable in connection with the present embodiment is an opaque kind of polyurethane. The foam material is desirably opaque because it serves to provide a light-tight shield for the unexposed film units. This is important when the container is removed from the camera and contains both exposed and unexposed film units. Towards this end the foam is intended to cover the entire opening of the compartment 38. Additionally, the foam serves to prevent ingress of dust to the container interior. As best shown in FIGS. 2 and 3, the border 18 is formed with a lanced tab 28 which serves to provide frictional drag. This is to enhance preventing the film unit 12 from being dislodged easily from a film container or magazine 30.

The film unit cassette includes a parallelepiped structure or cartridge 31 having a closed end 32 and an open faced end 34. The film units 12 are removably stored in the film cassette 30 and access to them is provided from the open end 34. A plurality of spaced light attenuating wall members 36, preferably opaque, which cooperate with themselves and with the interior container walls define the juxtaposed film storage compartments 38. A pair of longitudinal slots 40 is respectively formed in each compartment and each slot of a pair is vertically aligned with respect to the other so as to assist in guiding the translational movement of the film unit. The wall members 36 are spaced apart by a distance which prevents the expanded foam material from allowing the film unit to return to its original position.

Returning to FIG. 1, the photographic camera 10 is seen to include a camera body 42 having associated therewith a door 44 pivotally mounted thereon about the pivot axis 45. The door 44 is movable between the shown closed position and an open position which is not shown. The film cassette 30 is adapted to be slidably received and incrementally moved within an interior compartment 46 formed by the interior walls (not shown) of the camera body 42. Access to this interior compartment 46 may be gained by releasing a releasing latch button (not shown) formed on the side of the body 42.

Formed on the front vertical wall portion of the main body 42 are a number of apertures 48, 50. Mounted in registration with a lens taking aperture 48 is an objective or taking lens system 52 which is positioned along the optical axis $O_A$. The taking lens system 52 is arranged forwardly of an exposure opening 54 and forwardly of an exposure chamber 56 which is, in part, formed by a focal cone 58. Located in this exposure chamber 56 is a focal plane 60 at which the film units 12 are individually exposed.

A viewfinder (not shown) is also associated with the photographic apparatus. Such a viewfinder would have a field of view coextensive generally substantially with that of the taking lens system 52 for assisting a user in aiming and framing of the camera.

A photocell aperture 50 is adjacent the taking lens system 52. Mounted in registration with the photocell aperture 50 is a window 62 which is aligned with respect to a photocell assembly 64. The photocell assembly 64 is operatively connected to an exposure control network 66. The exposure control network 66 evaluates the scene light incident on the photocell assembly 64 in a known manner. The exposure control network 66, in turn, controls a blade mechanism 68 in a known manner such that an exposure defined by the blade mechanism 68 may be terminated when the exposure control network 66 reaches a value indicating a desired exposure.

The photocell assembly 64 includes a photocell lens (not shown) and a photodetector (not shown) of the photodiode type. The exposure control network 66 is responsive to the scene radiation incident on the photocell assembly 64 and effects termination of the exposure interval as a function of the time integration of the intensity of the scene light upon the photocell assembly as permitted by the overlapping sets of photocell sweep apertures (not shown) of the blade mechanism 68. Since the scanning shutter system and its control by such an exposure control network are known, a detailed description of such cooperation will not be given insofar as those details do not form an aspect of the present invention.

Continued reference is made to the blade mechanism 68. The construction and operation of such a blade mechanism 68 is more fully described in commonly-assigned U.S. Pat. No. 3,942,183, issued Mar. 2, 1977. As best shown, intermediate the taking lens system 52 and the focal plane 60 is the blade mechanism 68. It comprises two overlapping shutter blade elements 70, 72 of the so-called scanning type. Each of the shutter blade elements 70, 72 is provided with primary scene light apertures (not shown) so as to provide a progressively overlapping relationship with respect to the scene light exposure opening 54. This defines a progressive variation of effective aperture values in accordance with simultaneous longitudinal and lateral displacement of the blade elements. Additionally, each of the shutter blades 70, 72 include a plurality of secondary or photocell sweep apertures (not shown). Essentially, the photocell apertures move in correspondence with the primary apertures and progressively define varying secondary aperture values as a function of blade positioning during exposure. These photocell sweep apertures coincide with respect to the photocell assembly 64 for effectively and automatically controlling the intensity and spectral frequency of scene light which is being evaluated by the exposure control network 66.

The present invention includes a shutter blade drive assembly 74 which in the present invention is defined by a tractive electromagnetic device or solenoid (not shown). The solenoid causes longitudinal displacement of a plunger assembly (not shown) which rotates a walking beam (not shown) about a pivot pin. Details of the construction and operation of such a drive assembly 74 may also be found in the above-noted patent. Typically, with this type of shutter drive assembly there is provided a latch mechanism (also not shown). Such a latch mechanism is typically operable at the end of each exposure for latching the shutter blades 70, 72 in a scene light blocking condition. Since details of this latching mechanism do not, per se, form an aspect of the present invention, reference is made to commonly-assigned U.S. Pat. No. 4,040,072. To operate the camera for a given exposure cycle, a camera actuator button (not shown) powers up the camera and enables release of the shutter latch to allow shutter blade movement. In this manner, the exposure cycle is commenced.

Although not shown, the photographic apparatus 10 may have operatively associated therewith an electronic strobe or flash arrangement. Such an arrangement can be used in the manner described in commonly-assigned U.S. Pat. No. 4,358,186.

For initiating the processing of each of the film units 12, there is provided processing means 76. In this embodiment, the processing means 76 includes a pair of processing rollers 78 and 80. These rollers 78, 80 are suitably supported in the housing and are spaced apart to define a predetermined gap therebetween. This gap facilitates formation of the desired processing fluid thickness on the film unit in a known manner. The processing rollers 78, 80 are driven in a well-known manner by a motor and gear train assembly (not shown). In this embodiment, the rollers 78, 80 are positioned adjacent the open side 34 of the container 31. Thus, when a film unit 12 is being extracted from the container 31 by the film handling mechanism 24, a leading edge of the film unit 12 will pass into the nip of the rollers 78, 80. These rollers 78, 80 first operate to rupture the pod 20 as they are simultaneously advancing the film unit 12. Concomitantly the rollers 78, 80 further serve to spread the processing fluid uniformly across the photosensitive image receiving area 14. In this embodiment, the spreading of the processing fluid occurs immediately prior to exposure. The structure and method of spreading the film units prior to exposing the film unit for facilitating viewing thereof at an exposure station will be disclosed and claimed in commonly-assigned U.S. patent application Ser. No. 519,085, entitled "Method and Apparatus For Viewing Film Units At the Exposure Station", by Bruce K. Johnson, filed Aug. 1, 1983, now U.S. Pat. No. 4,508,437. It is again emphasized that the instant invention does not claim the fact that the spreading of processing fluid occurs prior to exposure. This spreading of the processing fluid prior to exposure is described as but one aspect of an embodiment of the present invention.

Reference is now made to the film handling mechanism 24 for extracting and returning the film unit 12. The film handling mechanism 24 is intended to selectively cooperate with a film unit 12 and withdraw the latter from the film container 31, advance it to an exposure station at the focal plane 60 whereat the film unit is exposed, and then return the exposed and processed film unit 12 to the same compartment in the film container, but at a locational arrangement which is laterally different than its original position.

In this particular embodiment, the film handling mechanism 24 includes a pick mechanism having a pair of pick arms 82 (only one of which is shown) extending from a pick carrier member 84. The carrier member 84 is rotatably connected with a driving link 86 to a timing wheel 88. The film unit carrier 84 is mounted and guided for equal forward and reverse reciprocal strokes along a path defined in part by a slot in interior camera structure (not shown). The timed sequence of operations of the film carrier 84 for purposes of withdrawing the film unit, for allowing exposure and reinsertion into the same container compartment is controlled by the timing wheel 88. The timing wheel 88 is caused to rotate by an energized motor (not shown). This motor is energized in response to the actuation of the camera exposure cycle button which when actuated powers up the camera 10. The timing wheel 88 when stationary is in the position with both of the pick arms 82 in the position indicated by the solid lines in FIGS. 1–3. In the stationary position, the pick arms 82 are arranged such that their finger members 87 are in registry with the notches 22 of the next film unit 12 to be exposed. See FIG. 2. It is the movement of the container 31 which causes successive ones of the film units 12 to be placed in registry with the pick arms 82 and fingers 87. The pick finger 87 has a given length as measured in the stroke direction which includes leading and trailing surfaces for respectively engaging opposite surfaces of the notch 22 for respectively engaging the film unit upon forward and return advancement thereof. It will be noted that the notch has a length exceeding that of the pick finger such that each film unit following advancement for exposure is returned to a position just short of its original location. Such play allows the film carrier to have equal strokes even though the film unit does not return to its original position. Although such play is utilized, the present invention could also use a camming arrangement between pick finger and notch which would cause the pick finger to snap out of engagement with the notch upon encountering the resistance of the foam on the film against the cartridge.

Translation of the film unit 12 from its original stored position to its exposure position commences upon rotation of the timing wheel 88. As the wheel 88 rotates, the driving link 86 pulls the film carrier 84 rightwardly from the solid line position viewed in FIG. 1 to the dotted line position. As such it causes the driving link 86 to advance the carrier 84. Accordingly, the film unit 12 is caused to be withdrawn from one of the compartments 38 of the film container 31 to the film exposure station located at the focal plane 60. The timing wheel 88 will cease movement at a one-half revolution point for a period long enough to allow for completion of the exposure cycle. When a film unit 12 is at the exposure station, the blade mechanism 68 has been operated so as to allow the coinciding primary apertures thereof to allow the scene light to impinge upon the film unit. Termination of exposure is achieved by the exposure control network 66 controlling the shutter drive assembly 74 in a known manner. At the termination of exposure, as indicated by the exposure control network 66, a signal is also transmitted therefrom to the timing motor. This signal again reenergizes the latter. Reenergization of the motor effects continued rotation of the timing wheel 88 in the clockwise direction. Of course, as the timing wheel 88 rotates towards completion of a single revolution, the driving link 86 translates in the opposite direction. Accordingly, it will drive the film carrier 84 and the film unit 12 leftwardly. During such translation, the film unit will again pass through the rollers 78, 80 but in the opposite direction.

In accordance with the present invention, the film unit 12 will not return to its original position after exposure. This is best indicated in FIG. 3. This is brought about by the fact that the film unit 12 has attached thereto the strips 26 of foam material. As noted, the foam used in this embodiment is of the polyurethane type which will expand upon the film unit 12 being withdrawn from the film compartment 38 and is compressed when drawn between the processing rollers 78, 80 during processing. The foam strips 26 expand again upon leaving the nip and will again be compressed when the film unit 12 is being returned to the same compartment. Expansion inhibits return of the film unit 12 to its original position within the compartment 38. This is because the foam strips 26 resist or block complete return of the film unit 12 into the interior of a compartment 38. This is best shown in FIG. 3. It will be appreciated that the film unit cannot return to its original position owing to the obstruction created by the expanded foam strips 26 and the cooperation of the pick fingers and notches as noted above. Since the film carrier 84 is being positively driven by the timing wheel 88, the carrier will slightly compress the foam strips in the direction of film carrier travel. This allows the film pick fingers 86 to return to their original position as shown in FIG. 3. However, FIG. 3 does not show this compression because the container 31 is being shown in the process of advancing an exposed film unit and bringing an unexposed one into alignment with the arms 82.

Following the termination of exposure, the film container advancement means 90 is actuated. In this particular embodiment the film container advancement means 90 includes a solenoid 92 operated in response to the exposure termination signal from the exposure control network 66 and a spring biased latching mechanism 94. The latching mechanism 94 latches onto teeth 98 on the end 32 of the cassette 30 having a plurality of teeth 96 so as to incrementally advance the cassette 30 such that each of the film units in their compartments is indexed into alignment with the film pick fingers 82. More particularly in this embodiment, when the solenoid 92 is energized, it will cause the latching arm 98 to pivot in a clockwise or downward direction, as viewed in the drawings, against the bias of a spring member 100. A pivoted latching finger 102 is engageable with individual teeth 96 to cause the cassette 30 to be incrementally advanced forwardly. Upon deenergization of the solenoid 92, the spring 100 causes the latching arm and finger 98 and 102; respectively, to move upwardly. Accordingly, the latching finger 102 rides upon the inclined surface of the next tooth 96 and engages a rear surface thereof. Thus, the film cassette 30 has been incrementally advanced so as to permit another exposure cycle to be commenced. The latching finger 98 also serves to restrain further forward axial advancement of the container.

It will be appreciated that the film cassette 30 may at any time be withdrawn from the storage compartment 46 after exposing only a portion of the film units 12 in the cassette 30.

It is apparent that the film units 12 do not return to their original position. In fact, the film units 12 are extended from the container by a greater distance than those film units 12 which are unexposed. See FIG. 3. It is clear that this provides a convenient means by which the user or device can readily determine which film units have been exposed and which have not.

The present invention contemplates, of course, that other means besides the foam strips 26 may be used. For instance, instead of using such foam material the present invention contemplates the use of some sort of electronic or electromagnetic sensing arrangement to indicate differences between exposed and unexposed film units.

It is believed from the foregoing that the operation of the present invention is readily apparent.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. A film cassette for use with a camera, said film cassette comprising:

an open faced casing;

a plurality of film units, each having a light sensitive area, stacked in said casing with a given edge portion of each presented at said open face for facilitating sequential removal of each within a camera for exposure; and, a light attenuating member located between adjacent film units and extending across the light sensitive area thereof so as to attenuate transmission of light to said light sensitive area of any of the undeveloped film units responsive to removal of a film unit whereby said cassette may be exposed to light following removal of one or more film units, but prior to exposure and development of all units, without admitting light to the light sensitive areas of the remaining film units wherein said light attenuating member is fixed within said casing so as to define therewith a separate compartment for each film unit having a compartment opening formed at the open face of said casing, and said given edge of said film unit is configured for cooperating with said compartment opening to light seal each said compartment prior to removal of its film unit.

2. The cassette of claim 1 wherein each said film unit includes expandable light attenuating material extending along its said given edge so as to be compressed into light sealing engagement with its compartment opening when the exposed film unit is originally positioned therein and to resist complete reinsertion of the film unit following its exposure and development whereby said cassette provides a lighttight environment for unexposed film units and storage for exposed units.

3. A camera system comprising:
   a film cartridge having an open face;
   a plurality of discrete photographic film units stacked within said film cartridge with a given edge portion thereof located at said open face;
   means for receiving said film cassette;
   a focal plane configured for receiving a film unit thereat;
   means for directing image forming light rays from a photographic scene to said focal plane and for controlling the passage of scene light thereto so as to produce an exposure of the film unit located thereat; and,
   means responsive to initiation of an exposure cycle for cooperating with an unexposed film unit to advance it from its original location in said film cartridge to said exposure plane, and following an exposure thereof, for subsequently returning said film unit to a locational arrangement in said cartridge at least distinguishably different from its original location so that exposed film units are clearly distinguishable from unexposed film units.

4. The invention of claim 3 wherein each exposed film unit upon return is laterally displaced with respect to its original location.

5. The invention of claim 4 wherein said means for changing the position of the unit resists full return of each said film unit in said cartridge so as to facilitate maintaining each of said film units in a distinguishably displaced location.

6. The invention of claim 5 wherein said means for resisting full return comprises expandable material located on each film unit for being in a compressed state when the film unit is in its original position and for expanding upon advancement of the film unit to said exposure plane for exposure so as to thereby resist full return of the film unit to its original location in said cartridge.

7. The invention of claim 6 wherein said expandable material is opaque and serves to provide a lighttight arrangement with cartridge.

8. The invention of claim 3 wherein said means for changing the position includes a pick assembly driven through equal forward and reverse strokes and including a pick member for engaging an indentation in an edge of the film unit, said pick member having a given length as measured in the stroke direction and including leading and trailing surfaces for respectively engaging the film unit upon forward and return advancement thereof, and each of said film units including an elongated pick engaging indentation of a length exceeding the length of said pick member such that each film unit, following advancement for exposure, is returned to a position just short of its original location in accordance with the excess length of said indentation.

9. A film cassette for use with a camera having a film handling mechanism driven through forward and reverse strokes for advancing a film unit to a focal plane of the camera for exposure during a forward stroke of the film handling mechanism, said film cassette comprising:
   a film cartridge; and,
   a plurality of discrete film units located within said cartridge, each of said film units including means for cooperating with said film handling mechanism for allowing advancing said film from its original location in said cartridge during the forward stroke and for returning said film unit during the reverse stroke of said film handling mechanism, and said cooperating means including means for returning each film unit to a new position in said cartridge just short of its original location so that unexposed film units are distinguishable from unexposed film units in said cartridge.

10. The invention of claim 8 wherein said means for cooperating includes expandable and contractable material located on the leading edge of each film unit and being in a compressed state when the film unit is in its original position but expandable upon advancement of the film unit for exposure so as to thereby resist full return of the film unit during its return to the cartridge.

11. A system for use in facilitating the differentiating of exposed and unexposed units in an image recording apparatus comprising:
   an image recording unit;
   means for defining a housing having at least one compartment being sized and configured to store therein at least one of said units;
   said unit capable of being at least partially removable from an original stored position in said compartment by a film unit handling mechanism for allowing exposure of said unit and being returnable into said compartment by the film handling mechanism to a new stored position different from the original stored position; and,
   means operable with the film handling mechanism for altering the position of said unit relative to the original position when the exposed unit is returned to said compartment by the mechanism so as to facilitate differentiating between exposed and unexposed units because of the altered position.

12. The system of claim 11 wherein said housing means includes a plurality of said compartments in juxtaposed relationship and said system further includes means for mounting said housing means for advancement, and means for incrementally advancing said housing means so that each storage compartment is sequentially positioned at an exposure position; and film handling means selectively operable for at least partially removing each of said units from the original storage position to the exposure position and for returning the exposed film unit into said compartment, said expandable material prevents further return of said unit into said compartment to thereby indicate that said unit has been exposed.

13. A method of distinguishing between exposed and unexposed image recording units which are storable in a housing having a plurality of compartments being sized and configured to store at least one of the units therein, wherein the units are stored in an original stored position, the method comprising the steps of:
   at least partially removing a film unit from its original position in the compartment for allowing exposure thereof; and,
   returning the film unit to a new stored position in the same compartment different from the original stored position to thereby indicate the fact that the film unit has been exposed.

14. The method of claim 13 wherein said returning step includes the step of altering the dimension of at least one of the units and its associated housing compartment upon at least partial removal of said unit from the original position for exposure purposes so as to thereby resist return of the unit to the original stored position so that the difference between an exposed and unexposed film unit is determinable by the position of the exposed unit with respect to the unexposed unit.

15. A photographic system comprising:
means for receiving and mounting a film cassette for movement along a given path;
a film cassette including a plurality of adjacent photographic film compartments each having an opening for permitting removal of a photographic film unit therefrom, each said compartment retaining a film unit therein;
means for directing image forming light rays from a photographic scene to a focal plane and for controlling the passage of scene light thereto so as to produce an exposure of a film unit located thereat; and,
film handling means responsive to initiation of an exposure cycle for cooperating with an unexposed film unit to advance said unit from its compartment to said focal plane, and following an exposure thereof, for subsequently returning the film unit to its said original compartment.

16. The system of claim 15 further including means responsive to the return of an exposed one of said units to its respective compartment by said film handling means for altering the position of said exposed unit relative to its original position whereby an exposed film is distinguishable from exposed film units.

17. The system of claim 16 wherein said position altering means includes means on each said unit which restricts return of said unit to its original position in its original compartment.

18. The system of claim 15 wherein said system further includes means for incrementally advancing said cassette along said path following return of an exposed film to its original compartment so as to present an adjacent unexposed film unit at a position which is cooperable with said film handling means whereby the unexposed film unit can be moved to said focal plane for exposure.

19. A film cassette for use with photographic apparatus, said apparatus comprising:
a casing having an open face;
a plurality of film units disposed adjacent each other, each one of which has a light sensitive area and means for facilitating their insertion and removal into and from said casing through said open face,
means for attenuating light from each of said light sensitive areas whenever said units are in said casing and for attenuating light from said light sensitive areas of units remaining in said casing if one or more units is removed from said casing, whereby said casing can be removed from the photographic apparatus without light affecting said light sensitive areas and film units can be removed from said casing when within the photographic apparatus without light affecting other ones of said film unit; said attenuating means including means on separate ones of said units which cooperate with said casing to protect the light sensitive area of each unit from ambient light coming through said open face.

* * * * *